United States Patent [19]

Alteepping et al.

[11] Patent Number: 4,514,463

[45] Date of Patent: Apr. 30, 1985

[54] LAMINATE SUITABLE AS SEALING LINER FOR LIQUID CONTAINERS

[75] Inventors: Josef Alteepping, Ochtrup; Dietrich E. Bornemann, Coesfeld, both of Del.X

[73] Assignee: Standard Oil Company (Indiana), Chicago, Ill.

[21] Appl. No.: 592,382

[22] Filed: Mar. 22, 1984

[51] Int. Cl.³ .............................................. B32B 27/00
[52] U.S. Cl. .................................. 428/286; 156/244.11; 156/244.27; 405/53; 405/270; 428/284; 428/290; 428/340; 428/341; 428/343; 428/351; 428/354; 428/355; 428/413; 428/516
[58] Field of Search ....................... 156/244.11, 244.27; 428/284, 286, 290, 516, 296, 340, 341, 343, 351, 354, 355, 413; 405/53, 270

[56] References Cited

U.S. PATENT DOCUMENTS 4,368,233  1/1983  Barkis et al. ...................... 428/290
4,434,204  2/1984  Hartman ............................. 428/290

*Primary Examiner*—James J. Bell
*Attorney, Agent, or Firm*—David E. Boone; William T. McClain; William H. Magidson

[57] ABSTRACT

A laminate suitable for use as a pond or pool liner is shown, the laminate comprising a batt of non-woven polyolefin fabric weighing 100 to 300 grams per square meter having thermally bonded thereto an ethylene/-butylacrylate polymer in an amount of 600 to 1200 grams per square meter, said copolymer containing 10–25 weight percent butylacrylate.

8 Claims, No Drawings

LAMINATE SUITABLE AS SEALING LINER FOR LIQUID CONTAINERS

This invention relates to laminates. One of the aspects of this invention relates to a product suitable for use where a water resistant coating is applied to liquid containers including, for example, water treatment plants, ponds, swimming pools, tank linings, pipe linings, etc. In a further aspect, the invention relates to a method of manufacturing these laminates and to the application of the laminates onto substrates.

Laminates have been used for such uses which comprise various forms of polyolefin sheeting alone or in combination with an anchoring or strength giving material. Often these materials are impregnated with asphalt either over the whole surface of the liner or, at least, in the joints between sheets making up the total liner. A combination suitable for such a liner is shown in U.S. Pat. No. 4,035,431 (1977) which describes polypropylene non-woven fabric bonded to a particular polyethylene film.

It is an object of this invention to provide a laminate resistant to water and physical stress for service in application to substrates such as concrete, steel, ceramic, and wood. A further object of this invention is to provide a method for manufacturing such laminates and the application of the laminates to the substrates named. The substrate is then permanently protected from corrosion caused by water.

Other objects of the invention will be apparent to those skilled in the art upon reading this description.

Broadly, our invention resides in a method of making a liner for a liquid container comprising heating a polyolefin fabric having a weight of 100 to 300 grams per square meter at a temperature of 110° to 160° C. for a time of 30 to 120 seconds, extruding onto said fabric an ethylene/butylacrylate copolymer containing 15 to 25 weight percent butylacrylate in an amount of 600 to 1200 grams per square meter, and forcing the polymer into the interstices of the fabric.

In another aspect, our invention resides in a liner for a liquid container comprising a laminate comprising a layer of ethylene/butylacrylate copolymer in an amount of 600 to 1200 grams per square meter thermally bonded to a heat set non-woven polyolefin fabric having a weight of 100 to 300 grams per square meter, said ethylene/butylacrylate copolymer containing 15 to 25 percent butylacrylate on a weight basis.

Still further, the invention resides in a method of lining a pond or pool by applying the liner to the substrate by means of an adhesive such as an epoxy resin. This is possible since the extrusion laminating one side of the non-woven to the polymer maintains the original structure of the non-woven to provide the adhesive bridge.

The basic material for the production of such laminates is a non-woven polyolefin fabric produced by needle punching carded fibers of a polyolefin, preferably polypropylene staple yarn. Such non-woven fabrics are available from a number of sources and have a weight range of 100 to 300 grams per square meter. Fabrics having a weight of approximately 150 grams per square meter have been found to be particularly suitable.

To provide dimensional and thermal stability, the non-woven fabric is heat-set prior to use. The temperature and time of heat-set depend upon the particular polyolefin fabric used, but this can be easily determined by a few trials. For polypropylene fabric, a temperature of 110° C. to 160° C. for a time of 30 to 120 seconds is suitable.

The thermoplastic coating resin which we use is an ethylene/butylacrylate copolymer having a relatively high butylacrylate content, i.e., 15 to 25 weight percent butylacrylate. This polymer works well in the process and provides good resistance to stress, abrasion, weather, water and to microorganisms. Furthermore, no plasticizer is used in the resin, an additive which is detrimental upon prolonged exposure to the elements. For instance, the abrasion resistance is approximately 20 times higher than polyvinylchloride, a resin which has been proposed for this use.

The laminate is prepared by extruding the copolymer on the heat-set, non-woven fabric. Temperatures will depend, to some extent, upon the particular polymer, but the temperature should be in the range of 240° to 280° C. For good results, approximately 600 to 1200 grams should be applied per square meter of the non-woven fabric. This will produce a copolymer layer in the range of 0.5 to 1.5 millimeters thick. After copolymer application, the resin fabric laminate is passed between rollers in a roll mill, this forcing molten polymer into the interstices of one side of the non-woven fabric.

In use, the laminate is applied to substrate, such as concrete, wood, metal, etc., by means of suitable adhesive such as epoxy resin. Such resins are commercially available and the adhesive generally comprises the epoxy resin in combination with a curing agent such as an amine.

The exact composition of the copolymer is subject to variation and various additives can be added thereto, such additives including pigments, stabilizers, and the like.

In application of the laminate to a substrate, joints between adjacent sections of the laminate can be bonded to be watertight either by hot melt sealing or by heat bonding of the overlapping layer.

The following example illustrates a specific embodiment of the invention but it should not be considered unduly limiting.

EXAMPLE

A non-woven polypropylene fabric was heat-set by heating at 140° C. for one minute to render it dimensionally and thermally stable. The fabric used was Propex Style No. 4545, a commercial product of Amoco Fabrics Company, having a weight of 150 grams per square meter and a thickness of one-half millimeter. An ethylene/butylacrylate copolymer containing 17 percent by weight butylacrylate having a melt flow rate of 7 g/10 min. at 230° C. using a weight of 2,160 grams (Unifos Kemi AB Dex 922) was extrusion coated onto the fabric at a temperature of approximately 270° C. and the laminate passed into the nip of a roll mill. The copolymer coating was applied in an amount of 850 grams per square meter resulting in a resin layer about one millimeter thick. The resulting coated fabric was 1.2 millimeters thick.

This fabric was used to form a lining on the walls and bottom of a swimming pool. Attachment of the coated fabric was by means of an epoxy resin adhesive applied between the uncoated side of the fabric and the concrete sides and bottom of the pool. Joints were overlapped and heat sealed. Resistance to abrasion, puncture, water, and microorganisms was excellent.

Those skilled in the art will recognize that reasonable variation and modification are possible within the scope of our invention.

We claim:

1. A liner for a liquid container comprising a laminate comprising a layer of ethylene/butylacrylate copolymer in an amount of 600 to 1200 grams per square meter thermally bonded to a heat-set, non-woven polyolefin fabric having a weight of 100 to 300 grams per square meter, said ethylene/butylacrylate copolymer containing 15 to 25 percent butylacrylate on a weight basis.

2. The liner of claim 1 wherein said non-woven fabric is made from polypropylene staple fibers.

3. The liner of claim 2 wherein said copolymer contains approximately 17 percent butylacrylate applied in an amount of 850 grams per square meter and said fabric has a weight of approximately 150 grams per square meter.

4. A method of making a liner for a liquid container comprising heating a polyolefin non-woven fabric having a weight of 100 to 300 grams per square meter at a temperature of 110° to 160° C. for a time of 30 to 120 seconds, extruding onto said fabric an ethylene/butylacrylate copolymer containing 15 to 25 weight percent butylacrylate in an amount of 600 to 1200 grams per square meter, and forcing the polymer into the interstices of the fabric.

5. The method of claim 4 wherein said polyolefin is polypropylene.

6. The method of claim 5 wherein said fabric has a weight of approximately 150 grams per square meter and wherein said copolymer contains approximately 17 weight percent butylacrylate and is applied in an amount of approximately 850 grams per square meter.

7. The method of lining a pond or pool comprising applying the liner of claim 1 to a substrate by means of water resistant resin adhesive.

8. The method of claim 7 wherein the adhesive is an epoxy resin.

* * * * *